United States Patent [19]

Grass

[11] Patent Number: 4,647,225
[45] Date of Patent: Mar. 3, 1987

[54] SUPPORT AND GUIDE ROLLER FOR EXTENSION GUIDE

[76] Inventor: Alfred Grass, Konsumstrasse 20, A-6973 Höchst, Austria

[21] Appl. No.: 826,095

[22] Filed: Feb. 6, 1986

Related U.S. Application Data

[63] Continuation-in-part of Ser. No. 556,345, Nov. 30, 1983.

[30] Foreign Application Priority Data

Mar. 6, 1985 [DE] Fed. Rep. of Germany ....... 3507821

[51] Int. Cl.$^4$ ...................... F16C 29/06; A47B 88/14
[52] U.S. Cl. ........................................ 384/19; 384/10
[58] Field of Search ................................. 384/18-23, 384/10; 16/91, 107; 312/341 R

[56] References Cited

U.S. PATENT DOCUMENTS

| | | | |
|---|---|---|---|
| 2,873,150 | 2/1959 | Hutzelman | 312/341 R |
| 3,243,237 | 3/1966 | Sprecher | 384/19 |
| 3,361,489 | 1/1968 | Gionet | 384/19 |
| 3,451,095 | 6/1969 | Kiefer | 16/107 |
| 3,509,665 | 5/1970 | Bartlett et al. | 16/91 X |
| 3,990,756 | 11/1976 | Han | 312/341 R X |
| 4,019,794 | 4/1977 | Rowe | 312/311 |
| 4,357,733 | 11/1982 | Neville | 16/107 |
| 4,376,555 | 3/1983 | Grass | 384/18 |

Primary Examiner—Stuart S. Levy
Assistant Examiner—Thomas R. Hannon
Attorney, Agent, or Firm—Horst M. Kasper

[57] ABSTRACT

The support and guide roller for extension guides for drawers consists of a roller body of hard material whose outer surface forms a first bearing surface. A circumferential slot is arranged in the area of the first bearing surface. The slot is filled with an elastic material. In the case of an unloaded roller the elastic material forms a second bearing surface protruding radially a specific amount above the first bearing surface. Transverse spaces of greater width than the slot are provided in the area of the slot. The spaces are likewise filled with an elastic material which is homogeneous and continuous relative to the elastic material in the slot.

21 Claims, 19 Drawing Figures

SUPPORT AND GUIDE ROLLER FOR EXTENSION GUIDE

CROSS-REFERENCE TO RELATED APPLICATIONS

This application is a continuation-in-part application of another application filed Nov. 30, 1983 and bearing Ser. No. 556,345. The entire disclosure of this latter application, including the drawings thereof, is hereby incorporated in this application as if fully set forth herein.

BACKGROUND OF THE INVENTION

1. Field of the Invention

The present invention relates to a method of production of a support and guide roller for extension guides and for pull-out guides for drawers or the like with a running tread of plastic rolling off between a drawer rail and a frame rail.

2. Brief Description of the Background of the Invention Including Prior Art

Such a support and guide roller is known in many forms.

One such form is based on the style of an O-ring set into the outer surface. This O-ring protrudes above the circumference of the hard bearing surface thus creating a softer, second bearing surface. The disadvantage of this construction is, however, that the O-ring rubs and chafes on the slot base and thus, in the case of heavy loads, starts to compress, stretch and then shear off. The service life of such a known roller is therefore relatively short.

BRIEF SUMMARY OF THE INVENTION

1. Purposes of the Invention

It is an object of the present invention to further developing a roller for pull-out guides for drawers so as to achieve a substantial increase in service life.

It is an object of the present invention to provide a support and/or guide roller for pull-out guides for drawers, which assures with lightweight and unloaded drawers a running substantially free of rattling and therefore a quiet running, and which assures in cases of heavy loaded drawers a problem-free transfer of the load.

It is another object of the present invention to provide rollers performing a strong damping against shock and vibration impact in a radial direction based on the structure of the roller.

It is a further object of the present invention to superimpose an outer structure to a roller, which structure has a relatively high compressibility and thus is able to damp shocks and vibrations generated by solid guide surfaces.

These and other objects and advantages of the present invention will become evident from the description which follows.

2. Brief Description of the Invention

The present invention achieves this object by disposing a circumferential slot filled with an elastic material in the area of the first bearing surface. The elastic material, forms a second bearing surface in the unloaded state, by protruding radially a certain amount above the first bearing surface. Transverse spaces of a greater width than the width of the slot are disposed in the area of the circumferential slot. These transverse spaces are likewise filled with an elastic material which is homogeneous with the elastic material in the slot.

The roller comprises a roller body of hard material, whose outer surface forms a first bearing surface. A circumferential slot is arranged in the area of the first bearing surface. An elastic material filling is filled into the circumferential slot. The elastic material forms a second bearing surface when the roller is without load. The second bearing surface protrudes radially by a specific amount above the first bearing surface.

Transverse apertures and spaces of greater width than the width of the circumferential slot are arranged in the area of said circumferential slot. The transverse apertures are likewise fitted with the elastic material which is homogeneous with the elastic material in the circumferential.

The transverse spaces can be formed as transverse apertures. The circumferential slot can open outwards radially in the shape of a wedge. The roller body can be of a two-piece construction. The soft material can be injection molded. The transverse apertures can be initially injection apertures for the soft marterial. The slot together with transverse space can form a T-section profile for the two-piece roller body. The circumferential slot can show a sectional profile of a wedge where the slot base is wider than the width of the circumferential slot in the area of the bearing surface for a two-piece roller body. The circumferential slot 15 is preferably furnished with grooves which protrude as seen in an axial sectional view, in the case of a two-piece roller.

The roller body can comprise two roller parts. One of the roller parts has a plurality of pins disposed parallel to the wheel axis over its area. The pins engage in corresponding drillings disposed parallel to the wheel axis in a second opposite roller part so as to form a space between the two roller parts. A flat ring of the soft material can be disposed in the space between the two roller parts and having a plurality of drillings, each of said drillings being penetrated by one of the pins.

According to one aspect of the invention two flat rings are disposed on opposite face sides of the roller. The roller body is preferably furnished with drillings disposed in parallel to the roller axis and distributed circumferentially. The drillings can be penetrated by a connecting part of a soft material with each surface of the soft material contacting homogeneously with each of two flat rings. Each of the two rings can be fitted radially in an open slot in the roller body.

The roller body preferably consists of two adjoining roller parts which form between themselves a cruciform slot. The cruciform slot can include an annular slot running along the outer surface of the roller and transverse drillings. The roller parts are advantageously penetrated by the axial transverse drillings. A base of the slot can have an annular dove tail recess. A flat ring of the soft material can have pre-formed axially directed and peg-shaped connecting parts and is fitted into the recess and the transverse drillings.

An outer surface part disposed at the roller body can face radially outwards. The outer surface part can be made of soft material and the surface part can be of reduced width as compared with the hub surface side. Axially facing pegs can be evenly distributed over the extent of the roller body and can be disposed on the face of a respective surface part. The pegs can snap into corresponding recesses on the faces of the fitted flat rings of the soft material. Radially inwardly directed and wedge-shaped recesses in the roller body can form annular circumferential slots for engaging the flat rings at an inner ring edge.

The roller body can include two roller parts. Each of the roller parts can have a radial symmetry over its area and the two roller parts can be aligned with each other. Each roller part is preferably provided with axial transverse drillings. The transverse drillings in the two roller parts are in an aligned position relative to each other. A flat ring of soft material can be disposed in an annular slot formed between the two roller parts. The transverse drillings can penetrate the flat ring of soft material. The transverse drillings of the soft material preferably align with the transverse drillings of the roller parts in axial direction. A plurality of pins can be provided. The transverse drillings of the roller parts and the transverse drillings of the flat ring are each penetrated by one of the axially directed pins.

Two spaced flat rings can be formed of soft material and be disposed in two annular slots spaced apart in the bearing surface of the roller body. Each slot can have a base which opens into axial and evenly distributed transverse drillings over the area of the roller and where the transverse drillings are filled with the soft material which forms the two flat spaced rings in the area of the annular slots and wherein a radial outer part of the two soft rings forms soft bearing surfaces.

According to a further aspect of the invention a roller is provided as support and/or guiding for drawers or the like. A circular body is made from plastic. A first running tread provides substantially rigid support to the circular body transmitting a load when loaded relatively heavily. A second running tread provides elastic support to the circular body transmitting the load when loaded relatively lightly because of spring deformation vertical to a running tread surface. A first running tread is provided with a concentric recess annular groove having lateral recesses, where an elastically deformable mold ring is injected into said groove and lateral recesses for forming a single piece of first running tread and injection molded ring.

The roller can be constructed to run between a drawer rail and a frame rail. The second running tread can be provided by a projecting bead collar formed as one piece with the circular body made from plastic. The projecting bead collar protrudes radially by an amount corresponding to from about 2 to 20 percent of the radius of the circular body.

The projecting bead collar preferably protrudes radially by an amount corresponding from about 4 to 10 percent of the radius of the circular body. The projecting bead collar is provided by an annular axial groove formed into a peripheral face of the circular body. The body shows in the area of the groove base a concentric narrowing region relative to the first running tread and a decreasing of the cross-section of the projecting bead collar. An outer projecting bead edge is provided relative to each of two axial front sides of the circular body.

A plastic ring covering part of a running tread of the circular body can be provided which is elastically deformable at the running tread in a region of a bending of the ring. A bearing support can be provided to transfer the load exerted onto the circular body. The running tread can be provided with a concentric radial annular groove. An intermediate mold ring can be disposed in the groove which mold ring is elastically deformable based on its small cross-section and which protrudes from the running surface by a small amount. The spring properties of a projecting bead collar of the circular body can be adjustable based on an elastic mass injected into an annular groove open to one peripheral side of the circular body.

There is also provided a method for damping shocks and vibrations transmitted by a roller providing support and/or guiding for drawers or the like. An inner circular body is provided showing a relatively small compressibility when impacted in a radial direction from the outside. A circular groove having lateral recesses is disposed in the outer surface of the inner circular body. A circular outer structure is superimposed by injection molding of an elastic mass into the circular groove of the inner circular body. The elastic mass has a higher compressibility for damping shocks and vibrations impacting in a radial direction from the outside before they meet the circular body showing a relatively small compressibility. Spring properties of a supporting surface of the outer circular body are provided by the elastic mass injected into an annular groove on the outer surface of the circular body such that the inner circular body and the elastic mass form a single body.

The compressibility of the outer circular structure can be increased by generating void space in the material employed in order to furnish configurational damping. A second highly compressible material can be attached to the periphery of the circular body in order to furnish higher material damping to the structure against radial shocks and vibrations from the outside.

Therefore, a fundamental feature of the present invention is the elastic soft material which is firmly anchored in a circumferential slot because of a widening of the base or other foundation. The widened section of the slot is likewise filled with an elastic material in such a way that the elastic material in the slot and in the widened area are homogeneous. In this fashion, the soft elastic material is retained in the slot. Thus an enlargement of the diameter of the soft material is avoided during movement under pressure. The material can therefore neither stretch nor deform through this movement under pressure. Furthermore, an excellent anchorage is provided in the slot for this material.

The anchoring of the rings of soft elastic material in accordance with the invention acts so that the ring itself, even under the influence of movement under pressure, cannot increase in diameter. Thus the disadvantage of the previously known O-rings (U.S. Pat. No. 3,509,665) is avoided.

In a preferred embodiment of the present invention, the transverse spaces are formed as transverse apertures passing completely through the one-piece roller body. This has the advantage that these transverse apertures are also the injection apertures for the soft material. Thus this soft material can be inserted by an injection molding procedure. A preferred choice of material for the soft material is, for example, a polyurethane plastic or other plastic whose Shore hardness is selected to be less than the Shore hardness of the hard material of the first bearing surface and preferably at least 20% less.

According to a further preferred embodiment, the roller body is formed from two pieces. This allows various design forms of the slot with its widened base.

A first embodiment provides for the slot to be of a T-shape. The leg of the T forms the slot and the cross piece forms the widened section (transverse bearing space) for the soft material.

A further preferred embodiment provides for a wedge-shaped slot tapering outwards. A third embodiment shows a radial and parallel slot extending outwards whose bulkheads are formed by axial projections so that an excellent anchoring of the soft material of the roller body is created.

The subject matter of the present invention includes not only the subject of each single patent claim but also the combination of the single claims, one with another.

All the statements and features disclosed in the documents, particularly the construction detail illustrated by the drawings, are claimed as being essential for the invention in so far as they are, either singly or in combination, new as compared to the current state of the art.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
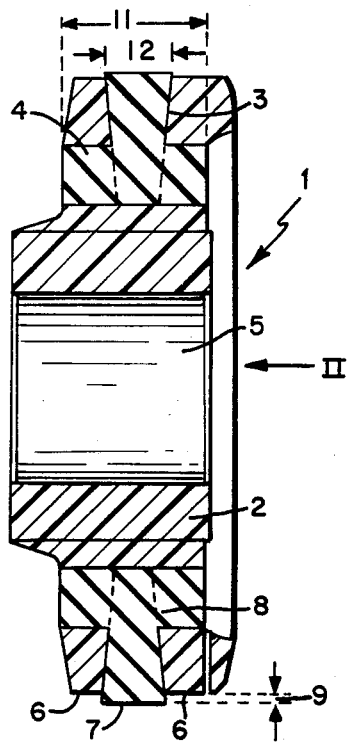
FIG. 1 shows a section through a support and guide roller in a first embodiment form.

In accordance with the present invention there are provided support and guide roller extension guides for drawers and the like, which consist of a roller body 2 of hard material. The outer surface of the roller body 2 forms a first bearing surface 6. A circumferential slot 3 is arranged in the area of the first bearing surface 6. The slot is filled with an elastic material 8. The elastic material 8 forms a second bearing surface 7 in the case of an unloaded roller 1. The elastic material protrudes radially by a specific amount 9 above the first bearing surface. Transverse apertures and spaces 4, 10 of greater width 11 than the width 12 of the slot 3 are arranged in the area of the slot 3. The transverse areas and spaces are likewise fitted with the elastic material 8 which is homogeneous with the elastic material 8 in the slot 3.

Figure 4:
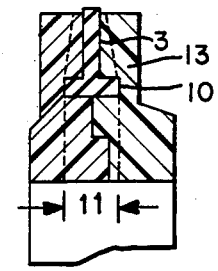
FIG. 4 shows a section through a roller in a second embodiment form.
Figure 5:
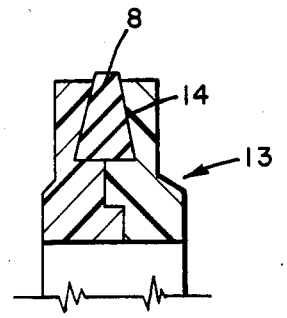
FIG. 5 shows a section through a roller in a third embodiment form.
Figure 6:
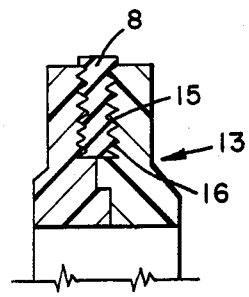
FIG. 6 shows a section through a roller in a fourth embodiment form.

Preferably, the transverse spaces are formed as transverse apertures. The slot 3 can open radially in outward direction and have the shape of a wedge. The roller body 2 can have a two-piece construction as illustrated in FIG. 4. The soft material 8 can be injection molded. The apertures 4 can be the injection apertures for the soft material 8. The slot 3 together with transverse space 10 can form a T-section profile in case of a two-piece roller body 13 as illustrated in FIG. 4. The slot 14 can be of a wedge-section profile for a two-piece roller body 13. The slot base of the slot 14 can be wider than the width of the slot 3 in the area of the bearing surface 7 as shown in FIG. 5. The slot 15 can have axially protruding grooving as illustrated in FIG. 6 for a two-piece roller 13.

Figure 8:
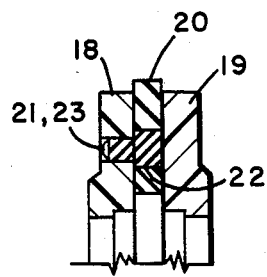
FIG. 8 shows a sixth embodiment example with a two-piece roller in which the soft material is retained by a transverse pin.
Figure 9:
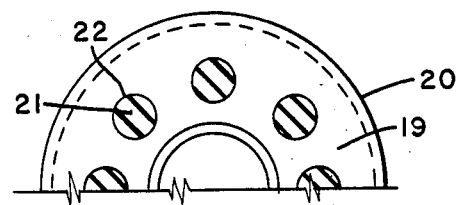
FIG. 9 shows a center longitudinal section through the representation in FIG. 8.

The roller body can comprise two roller parts 18, 19, one of which has multiple axially arranged pins 21 over its extent which engage in corresponding axial drillings 23 in the opposite roller part 18 so as to form a space between the roller parts 18, 19. A flat ring 20 of the soft material 8 can be disposed in the space between the roller parts 18, 19 and drillings 22 can be provided with each of said drillings being penetrated by a pin 21 as illustrated in FIGS. 8, 9.

Figure 10:
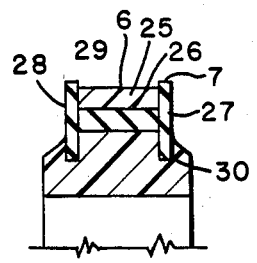
FIG. 10 shows a sectional view through the roller of a seventh embodiment example.
Figure 11:
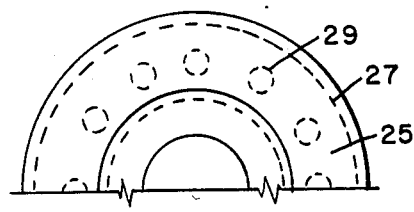
FIG. 11 shows a view of a center longitudinal section through the embodiment example in FIG. 10.

The roller body can have axial drillings distributed circumferentially. The drillings are penetrated by a connecting part of the soft material 8. Each face of the soft material 8 can be homogeneous with each flat ring 27, 28. Each flat ring can be fitted radially in an open slot 30 in the roller body 25 as seen in FIGS. 10 and 11.

Figure 12:
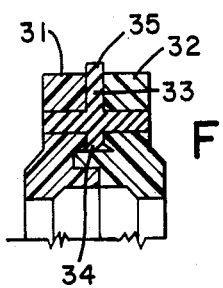
FIG. 12 shows a sectional view through the roller of an eighth embodiment example.

The roller body can consist of two roller parts 31, 32 which form between themselves a cruciform slot 33. The slot 33 is annular disposed and is penetrated by axial transverse drillings 37 of the roller parts 31 and 32. The base of the slot 33 can have an annular dove tail recess 34. A flat ring 35 of the soft material 8 can have pre-formed axial and peg-shaped connecting parts 36. The flat ring can be fitted into the recess 34 and the transverse drillings 37 as illustrated in FIG. 12.

Figure 13:
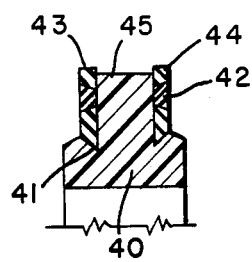
FIG. 13 shows a sectional view through the roller of a ninth embodiment example.
Figure 14:
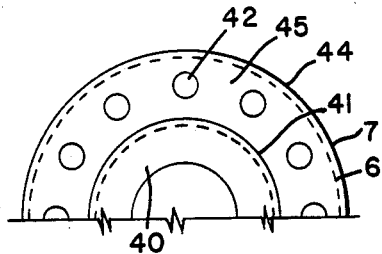
FIG. 14 shows a center longitudinal sectional view through the representation in FIG. 13.

The roller body 40 can have a radially outward-facing outer surface part 45. The outer surface part can be of reduced width as compared to the hub surface side. Axially facing pegs 42 can be distributed evenly on the face of the surface part 45 over the extent of the roller body 40. The pegs 42 can snap into corresponding recesses on the faces of the fitted flat rings 43, 44 of the soft material 8. The flat rings 43, 44 additionally can engage radially inwards into annular circumferential slot 41 as indicated in FIGS. 13 and 14.

Figure 15:
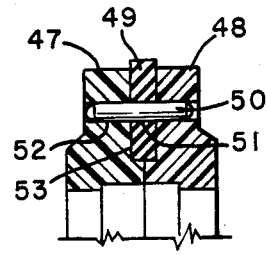
FIG. 15 shows a sectional view of a tenth embodiment example.
Figure 16:
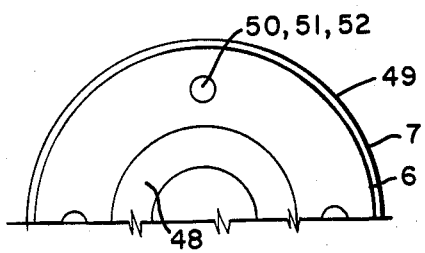
FIG. 16 shows a center longitudinal sectional view through the embodiment of FIG. 15.

The roller body can consist of two roller parts 47, 48. Each of the two roller parts can have axial transverse drillings 52 arranged radially over the area of the roller part and the axial transverse drillings can be aligned with each other. The transverse drillings 52 can penetrate an annular slot 53. A flat ring 49 of soft material 8 can be arranged in the slot 48. The flat ring of soft material can have transverse drillings 51 which align with the transverse drillings 52 of the roller parts 47 and 48. The transverse drillings 52 of the roller parts 47, 48 and the transverse drillings 51 of the flat ring 49 are each penetrated by an axial pin 50 as shown in FIGS. 15 and 16.

The roller body 55 can have two spaced annular slots 57, 58 in the bearing surface 6. Each of the slots has a base which opens into axial and evenly distributed transverse drillings 56 over the extent of the base. The transverse drillings 56 can be filled with the soft material 8 which forms two spaced flat rings 59 in the area of the annular slots 57, 58. The radial outer part of the slot forms the soft bearing surfaces 7 illustrated in FIGS. 17 and 18.

In more detail, the support and guide roller 1 shown in FIG. 1 comprises a plastic roller body 2 made in one piece from plastic material. The roller body 2 forms, on its external circumference, a first hard bearing surface 6, the first hard bearing surface 6 is only used when a drawer is heavily loaded.

A radial slot 3 extending outwards is provided in the area of the first hard bearing surface 6. Axially extending transverse apertures are disposed in the area of the radial slot.

Figure 2:
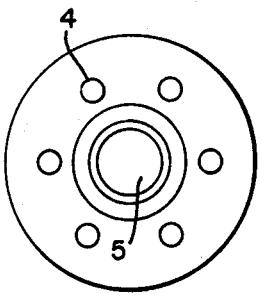
FIG. 2 shows a front view of the roller in FIG. 1 viewed in the direction of arrow II in FIG. 1.
Figure 3:
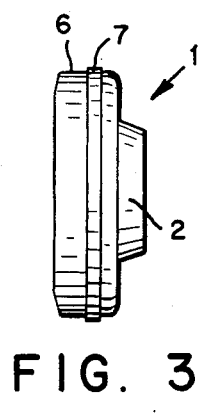
FIG. 3 shows an end view of the roller in FIG. 1.

According to FIG. 2 the transverse apertures 4 are disposed as circumferential transverse apertures 4. These apertures 4 perforate the roller body 2 and penetrate through it.

In this fashion, it is possible to inject the soft material 8 through the transverse apertures 4 by injection molding procedures. This provides an excellent anchorage for the soft material 8 in the area of the slot 3. The soft material completely fills the transverse apertures 4 and is homogeneous with the material in the area of the slot 3.

In this connection, it is essential that the soft material 8 forms a further bearing surface 7 which protrudes radially a specific amount 9 above the harder bearing surface 6.

The roller body 2 also has a hub 5. The bolt is fitted (not illustrated) through hub 5. The bolt is secured to a drawer rail in a conventional way.

The embodiment example shown in FIG. 4 is a two-piece roller body 13 which is provided with a T-shaped slot. This slot consists of the slot 3 and a transverse space 10. Taken together, this slot 3 and space 10 form a T-shaped profile. Similarly the slot 3 can be shaped according to the embodiment example of FIG. 1 and FIG. 4 in an opposite direction as compared to the direction shown, and thus form a wedge.

The slot 14 has the shape of a wedge in the embodiment example in FIG. 5. The width in the area of the bearing surface of the slot 14 in this case is less than the width in the area of the slot base.

It should be noted that the width 11 of the transverse apertures must always be greater than the width of the bearing surface 7 in the case of the embodiment of FIG. 1 in order to achieve an anchoring of the soft material 8 in the roller bodies 2, 13. This inventive concept is pertinent to all following embodiment examples.

This inventive concept of anchoring is realized in the embodiment example of FIG. 6 by a construction wherein the slot 15 extends radially outwards in a basically parallel fashion and has axial projections which engage in corresponding grooves in the roller body 13.

Figure 7:
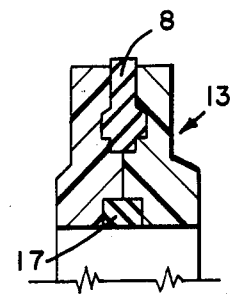
FIG. 7 shows a section through a roller in a fifth embodiment form.

According to the embodiment example of FIG. 7, the slot is again provided with a T-shaped cross-section. The advantage of this embodiment example includes the availability of identical roller halves. In the case of other embodiment examples with two-piece rollers, identical roller halves in general cannot be used. There two roller halves are connected by a ring 17. They are, therefore, placed on the ring 17.

A roller body is illustrated which consists of two roller parts 18, 19 in the embodiment example shown in FIG. 8. One roller part 19 has a shoulder of greater diameter so that this shoulder cannot engage in a drilling 23 in the opposite roller part 18.

A flat ring 20 of softer material 8 is fitted in the intermediate space so formed. The flat ring is furnished with corresponding drillings 22 through which the protruding portion of the pin 21 fits.

As shown in FIG. 9, several pins 21 with corresponding protrusions are distributed in an axial arrangement over the extent of the roller part 19, so that a good retention of the flat ring 20 together is achieved.

A roller body 25 is formed in which several drillings 26 are evenly and radially distributed over its extent according to the embodiment example illustrated in FIGS. 10 and 11. The drillings 26 are formed in an area of the roller body 25 of reduced width so that slots 30 for the location of corresponding flat rings 27, 28 are provided externally to and beneath the drillings 26. These flat rings 27, 28 are either pressed or injected into the slots 30. Thus the flat rings 27, 28 connecting part 29 are of the same material as the flat rings 27, 28 and by injection molding is homogeneous with the flat rings 27, 28.

FIG. 12 shows also a two-piece roller body comprising roller parts 31, 32. The roller parts 31, 32 have recesses forming a cruciform slot 33 on their contact faces. A dovetail recess 34 is formed at the base of the slot. The flat ring 35 is pressed into the recess 34 so that it creates an excellent seating in the dovetail recess 34. Further, the flat ring 35 is provided with axial connecting parts 36 (or plugs), which engage in correspondingly aligned transverse drilling 37 in the roller parts 31, 32.

In the embodiment example illustrated in FIGS. 13 and 14, a one-piece roller body 40 is again shown in which the side flanges are pulled back in the direction of the outer surfaces and in this area of reduced diameter, are formed wedge-shaped pegs 42, onto which corresponding flat rings 43, 44 are snapped. For additional position retention, the flat rings 43, 44 each engage in a corresponding annular slot 41 which extends around the roller body 40.

The embodiment example illustrated in FIGS. 15 and 16 provides a two-piece roller body comprising roller parts 47, 48. Both roller parts 47, 48 are identical and have correspondingly aligned transverse drillings 56 into which a pin 50 is press fitted and engages simultaneously in a corresponding transverse drilling 51 in a flat ring 49. The flat ring 49 together with all other previously and subsequently mentioned flat rings is formed of the soft material 8 described in the introduction which always forms the soft bearing surface 7. The radially disposed pins 50 extending over the area of the roller parts 47, 48 serve, therefore, to retain the flat ring 49.

Figure 17:
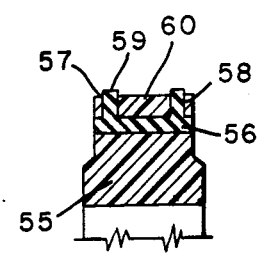
FIG. 17 shows a sectional view of the roller of an eleventh embodiment example.
Figure 18:
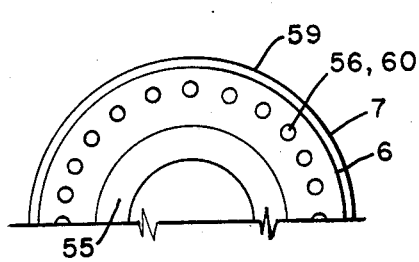
FIG. 18 shows a center longitudinal sectional view through the roller in FIG. 17.

The embodiment example illustrated in FIGS. 17 and 18 provides a one-piece roller body 55 with axially disposed transverse drillings 56 distributed over its extent. In the area of the transverse drillings 56, there are provided two annular slots, spaced apart, which on one side penetrate the outer surface, and thereby the bearing surface 6 of the roller body 55, and on the other side open out into each of the transverse drillings 56. The corresponding flat ring 59 of the soft material 8 is injected by an injection molding procedure into the annular slots 57, 58 together with connecting parts 60 and into the transverse drilling 56. This creates an excellent retention of the flat ring 59 and its corresponding connecting part 60.

Figure 19:
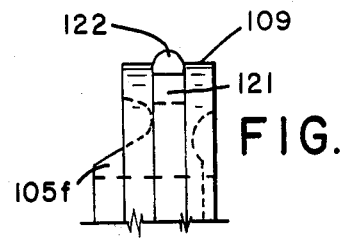
FIG. 19 is a sectional view of a roller where a softer material is placed along the center of the running tread.

As seen in FIG. 19, the running tread surface 109 can be provided with a concentric recess (ring groove), into which an elastic mold ring is inserted. Advantageously here an annular groove is provided in the running tread in the middle of the running tread 109 and an elastically deformable mold ring 121 is injected into the groove. In fact, the mold ring 121 provides one piece with the surrounding material based on the groove and thus with the full roller. The mold ring 121 thus forms the softer running tread surface 122. Element 105f shows the presence of a lateral widening of the roller toward the hub region for distributing the load over the axle.

The harder part of the roller body is generally made of a non-elastic plastic. A preferred material for the hard rigid plastic is for example Nylon 6, acetal resins such as Delrin, Hostraform (Trademark of Hoechst AG) and polyamides. The softer part is generally produced of an elastically deformable plastic such as for example a polyurethane plastic, a rubber, or neoprene. In addition, foams can be employed. The hardness of the plastic can be determined according to the Shore durometer method. Preferably, the harder part exhibits a Shore hardness of at least about 2 times that of the softer part and preferably a Shore hardness of at least about 5 times that of the softer part.

Furthermore the support or guide roller 105f (FIG. 19) can be provided with a ball bearing or with a friction bearing for transfer of the load. The features of the present invention can be transferred to all support and-/or guide rollers with plastic running treads independent of whether the bearing of the rollers is a friction or an antifriction bearing.

It will be understood that each of the elements described above, or two or more together, may also find a useful application in other types of roller system configurations and rolling support methods differing from the types described above.

While the invention has been illustrated and described as embodied in the context of a roller for drawers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A support and guide roller extension guide for drawers and the like, comprising
    a roller body of hard material, whose outer surface forms a first bearing surface with a circumferential slot arranged in the area of the first bearing surface;
    an elastic material filling filled into the circumferential slot, said elastic material forming a second bearing surface when the roller is without load, and which second bearing surface protrudes radially by a specific amount above the first bearing surface; and
    transverse apertures and spaces of greater width than the width of the circumferential slot are arranged in the area of said circumferential slot, which transverse apertures are likewise fitted with the elastic material which is homogeneous with the elastic material in the circumferential slot.

2. The support and guide roller extension guide according to claim 1 wherein the transverse spaces are formed as transverse apertures.

3. The support and guide roller extension guide according to claim 1 wherein the circumferential slot opens outwards radially in the shape of a wedge.

4. The support and guide roller extension guide according to claim 1 wherein the soft material is injection molded.

5. The support and guide roller extension guide according to claim 1 wherein the roller body is of a two-piece construction.

6. The support and guide roller extension guide according to claim 5 wherein the transverse apertures are injection apertures for the soft material.

7. The support and guide roller extension guide according to claim 5 wherein the slot together with transverse space forms a T-section profile for the two-piece roller body.

8. The support and guide roller extension guide according to claim 5 wherein the circumferential slot shows a sectional profile of a wedge where the slot base is wider than the width of the circumferential slot in the area of the bearing surface for a two-piece roller body.

9. The support and guide roller extension guide according to claim 5 wherein the case of a two-piece roller the circumferential slot 15 is furnished with grooves which protrude as seen in an axial sectional view.

10. The support and guide roller extension guide according to claim 1 wherein the roller body comprises
    two roller parts one of which has a plurality of pins disposed parallel to the wheel axis over its area which pins engage in corresponding drillings disposed parallel to the wheel axis in a second opposite roller part so as to form a space between the two roller parts; and
    a flat ring of the soft material disposed in the space between the two roller parts and having a plurality of drillings, each of said drillings being penetrated by one of the pins.

11. The support and guide roller extension guide according to claim 1 further comprising
    two flat rings to be disposed on opposite face sides of the roller, where the roller body is furnished with drillings disposed in parallel to the roller axis and distributed circumferentially, which drillings are penetrated by a connecting part of a soft material with each surface of the soft material contacting homogeneously with each of two flat rings, and where each of the two rings is fitted radially in an open slot in the roller body.

12. The support and guide roller extension guide according to claim 1
    wherein the roller body consists of two adjoining roller parts which form between themselves a cruciform slot where the cruciform slot includes an annular slot running along the outer surface of the roller and transverse drillings, where the roller parts are penetrated by the axial transverse drillings;
    wherein a base of the slot has an annular dove tail recess; and
    wherein a flat ring of the soft material having preformed axially directed and peg-shaped connecting parts is fitted into the recess and the transverse drillings.

13. The support and guide roller extension guide according to claim 1 further comprising
an outer surface part facing radially outwards and solidly disposed at the roller body, which outer surface part is made of soft material and which surface part is of reduced width as compared with the hub surface side;
axially facing pegs evenly distributed over the extent of the roller body and disposed on the face of a respective surface part, which pegs snap into corresponding recesses on the faces of the fitted flat rings of the soft material; and
radially inwardly directed and wedge-shaped recesses in the roller body forming annular circumferential slots for engaging the flat rings at an inner ring edge.

14. The support and guide roller extension guide according to claim 1, wherein the roller body includes
two roller parts each of which roller parts has a radial symmetry over its area and the two roller parts are aligned with each other and each roller part is provided with axial transverse drillings, where the transverse drillings in the two roller parts are in an aligned position relative to each other;
a flat ring of soft material disposed in an annular slot formed between the two roller parts, where said transverse drillings penetrate the flat ring of soft material and where the transverse drillings of the soft material align with the transverse drillings of the roller parts in an axial direction;
a plurality of pins where the transverse drillings of the roller parts and the transverse drillings of the flat rings are each penetrated by one of the axial pins.

15. The support and guide roller extension guide according to claim 1 further comprising
two spaced flat rings formed of soft material disposed in two annular slots spaced apart in the bearing surface of the roller body, where each slot has a base which opens into axial and evenly distributed transverse drillings over the area of the roller and where the transverse drillings are filled with the soft material which forms the two flat spaced rings in the area of the annular slots and wherein a radial outer part of the two soft rings forms soft bearing surface.

16. A roller providing support and/or guiding for drawers or the like comprising
a circular body made from plastic;
a first running tread providing substantially rigid support to the circular body transmitting a load when loaded relatively heavily; and
a second running tread providing elastic support to the circular body transmitting the load when loaded relatively lightly because of spring deformation vertical to a running tread surface wherein first the running tread is provided with a concentric recess annular groove having lateral recesses, where an elastically deformable mold ring is injected into said groove and recesses for forming the second tread and a single piece of first running tread and injection molded ring.

17. The roller providing support and/or guiding according to claim 16
wherein the roller is constructed to run between a drawer rail and a frame rail;
wherein the second running tread is provided by a projecting bead collar formed as one piece with the circular body made from plastic; and
wherein the projecting bead collar protrudes radially by an amount corresponding to from about 2 to 20 percent of the radius of the circular body.

18. The roller providing support and/or guiding according to claim 16 wherein the projecting bead collar protrudes radially by an amount corresponding from about 4 to 10 percent of the radius of the circular body;
wherein the projecting bead collar is provided by an annular groove disposed in a plane vertical to the roller axis and formed into a peripheral face of the circular body, which shows in the area of the groove base a concentric narrowing region relative to the first running tread and decreasing the cross-section of the projecting bead collar in an outward direction; and
wherein an outer projecting bead edge is provided relative to each of two axial front sides of the circular body.

19. The roller providing support and/or guiding according to claim 16 further comprising
a plastic ring covering part of a running tread of the circular body and elastically deformable at the running tread in a region of a bending of the ring; and
a bearing to transfer the load exerted onto the circular body;
wherein the running tread is provided with a concentric radial annular groove and where the intermediate attached mold ring disposed in said groove is elastically deformable based on its small cross-section and which mold ring protrudes from the running surface by a small amount; and
wherein the spring properties of the projecting mold ring of the circular body is adjustable by an elastic mass injected into holes open to one peripheral side of the circular body.

20. A method for damping shocks and vibrations transmitted by a roller providing support and/or guiding for drawers or the like comprising
providing an inner circular body showing a relatively small compressibility when impacted in a radial direction from the outside, where a circular groove having lateral recesses is disposed in the outer surface of the inner circular body; and
superimposing a circular outer structure by injection molding an elastic mass into the circular groove of the inner circular body which elastic mass has a higher compressibility for damping shocks and vibrations impacting in a radial direction from the outside before they meet the circular body showing a relatively small compressibility where spring properties of a supporting surface of the outer circular body are provided by the elastic mass injected into an annular groove on the outer surface of the circular body such that the inner circular body and the elastic mass form a single body.

21. The method for damping shocks and vibrations transmitted by a roller providing support and/or guiding for drawers or the like according to claim 20 further comprising
increasing the compressibility of the outer circular structure by generating void space in the material employed in order to furnish configurational damping; and
attaching a second highly compressible material to the periphery of the circular body in order to furnish higher material damping to the structure against radial shocks and vibrations from the outside.

* * * * *